(12) United States Patent
Schaub

(10) Patent No.: US 6,691,379 B2
(45) Date of Patent: Feb. 17, 2004

(54) HOSE CLAMP

(75) Inventor: Erwin Schaub, Jacksonville, FL (US)

(73) Assignee: Epicor Industries Inc., Denver, CO (US)

( * ) Notice: Subject to any disclaimer, the term of this patent is extended or adjusted under 35 U.S.C. 154(b) by 7 days.

(21) Appl. No.: 10/124,839

(22) Filed: Apr. 18, 2002

(65) Prior Publication Data

US 2003/0196301 A1 Oct. 23, 2003

(51) Int. Cl.[7] ............... B65D 63/00; F16L 33/04
(52) U.S. Cl. ......................... 24/279; 285/410
(58) Field of Search ............. 285/367, 410, 285/253; 292/256.67; 24/279, 19

(56) References Cited

U.S. PATENT DOCUMENTS

| | | | | | |
|---|---|---|---|---|---|
| 2,341,828 A | * | 2/1944 | Tetzlaff | ...... | 24/279 |
| 2,688,170 A | * | 9/1954 | Balzer | ...... | 24/279 X |
| 2,711,572 A | * | 6/1955 | Christophersen | ...... | 24/279 |
| 2,773,710 A | * | 12/1956 | Smith | ...... | 292/256.67 X |
| 2,852,832 A | | 9/1958 | Jones | | |
| 2,940,151 A | * | 6/1960 | Skelly | ...... | 24/279 |
| 3,537,147 A | * | 11/1970 | Pfeuffer | ...... | 285/420 X |
| 4,667,375 A | * | 5/1987 | Enlund | ...... | 24/274 R |
| 5,010,626 A | * | 4/1991 | Dominguez | ...... | 24/279 |
| RE33,639 E | * | 7/1991 | Oetiker | ...... | 24/20 CW |
| 5,329,673 A | | 7/1994 | Mason | | |
| 5,630,255 A | * | 5/1997 | Eliasson | ...... | 24/274 R |
| 6,000,104 A | * | 12/1999 | Mann | ...... | 24/274 R |

* cited by examiner

*Primary Examiner*—Robert J. Sandy
(74) *Attorney, Agent, or Firm*—M. S. Olson, Esq.; C. H. Castleman, Esq.; S. G. Austin, Esq.

(57) ABSTRACT

A hose clamp band member and a hose clamp comprising same, of the type having opposing looped ends connected to one another by a connection means such as a T-bolt, wherein the band is provided with two radially inward projecting ribs along at least a portion of its length, but that region of an outer portion of at least one of the loops that includes the connection point between the loop's outer- and inner portion is characterized by a substantially flat cross-sectional configuration.

9 Claims, 3 Drawing Sheets

HOSE CLAMP

The present invention relates generally to a hose clamp, and particularly to a configuration for the connection of an outward turned band end forming a loop for receiving a connection member of a hose clamp, exemplified by hose clamps of the "T"-bolt variety.

Hose clamps are conventionally employed to seal the connection between a hose or tubing and a cylindrical fitting or nipple. The clamps encircle at least a portion of the outer circumference of a hose disposed about a fitting, and are caused to constrict, i.e., to impart a radially inward directed compressive force to seal the hose to the fitting. Hose clamps employing a generally resilient, elongate band having opposing ends turned back upon themselves to form opposing loops and having connection means traversing the region between such opposing loops for tightening of the clamp as exemplified by clamps of the "T"-bolt variety are also known, and examples thereof are described for instance in U.S. Pat. Nos. 2,852,832 and 5,329,673. The turned back or outer loop portion of the band is generally affixed to an opposing portion of the radially outward facing surface of the band to form each loop, such as by welding or less typically, by bonding or mechanical affixation. Where the band member is substantially flat in cross-section across its length and including its looped ends, the respective surfaces to be welded to one another to form such loops can be readily disposed fully against each other in essentially complete contact without any appreciable voids therebetween, ensuring a generally rigorous and durable connection, as by welding at one or more discrete points, hereinafter referred to as "spot-welding".

The utilization of radially outward extending flares along generally both lateral edges of the band portions of clamps other than those of the T-bolt variety for providing improved distortion resistance to the band as it is rolled from a flat configuration into a cylindrical shape for utilization as part of a hose clamp, and moreover for reducing the possibility of damage to the underlying hose by the band's relatively sharp edges as the clamp is tightened into place is also known. It is believed that the use of such flares in T-bolt clamp constructions has not been known. A problem would be presented in T-bolt hose clamps combining the features of such flared lateral edges and their characteristic looped end portions, in that the flares along the lateral edges of each of the respective band surfaces to be welded to one another would likely tend to interfere with one another, preventing or restricting substantial intimate contact of such surfaces.

SUMMARY OF THE INVENTION

The present invention provides a hose clamp band member for encircling a portion of the outer circumference of an underlying hose, comprising a radially outward facing surface and a radially inward facing surface, a length extending from a first band end to an opposite second band end, and a width extending from a first- to a second lateral edge; at least one of a first loop member at said first band end and a second opposing loop member at said second band end, at least one said loop member having an outer loop portion and an inner loop portion each having a surface disposed against and connected to an opposing surface on the other thereof to form at least one connection point; said at least one loop member for receiving a tightening member for extending between the band ends to form said clamp, wherein said band further comprises a radially inward projecting rib extending along at least one lateral edge of said band, and said outer loop portion in a region including the connection point possesses a substantially flat cross-sectional configuration.

In a further embodiment of the present invention, a hose clamp is provided comprising a band member as described above and further comprising said tightening member in the form of a T-bolt comprising a transverse portion and a shank portion, for extending between the band's opposing loop members through respective apertures therein, and being formed and arranged to draw the loop members generally toward one another upon manipulation thereof.

DESCRIPTION OF THE DRAWINGS

In the accompanying drawings, like numerals denote like parts, and.

DETAILED DESCRIPTION

Figure 1:
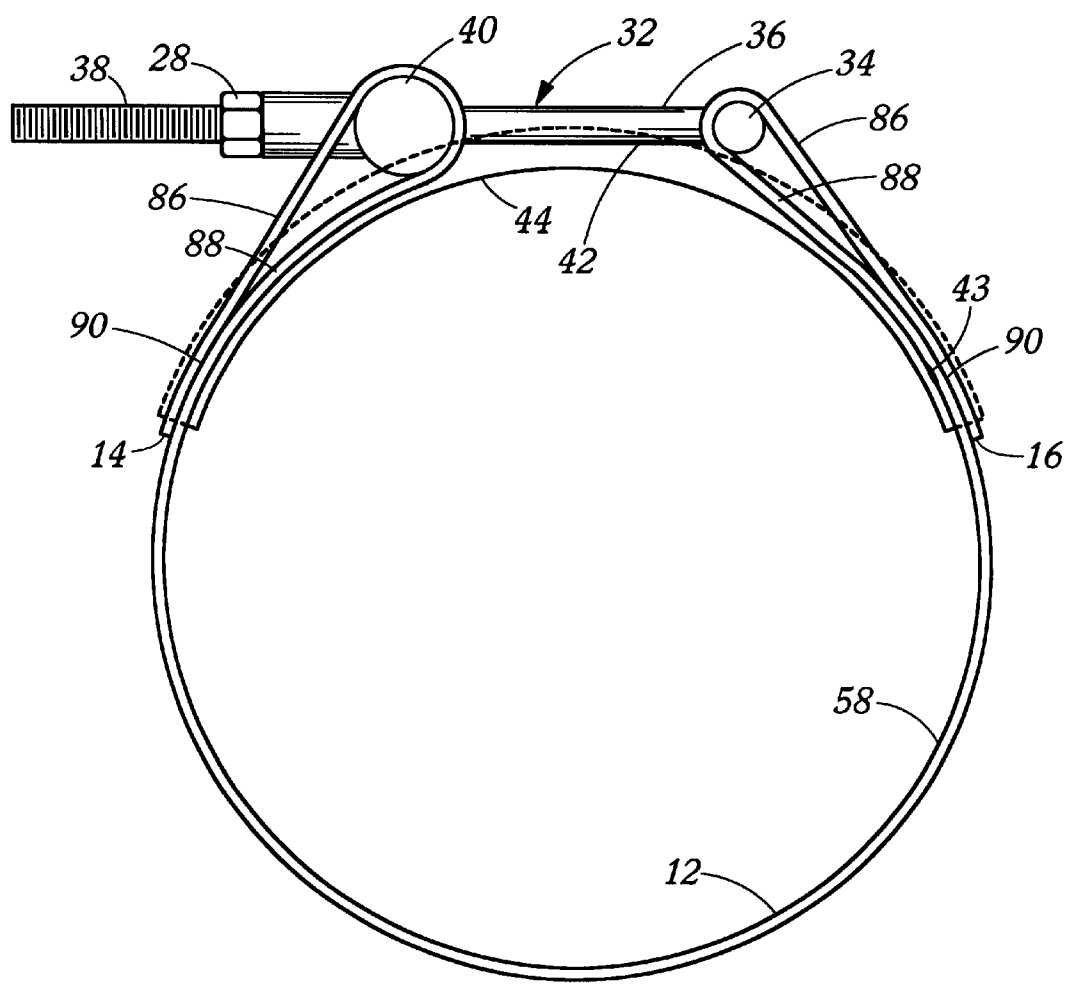
FIG. 1 is a side view of a T-bolt hose clamp incorporating a hose clamp band member, in accordance with embodiments of the present invention.
Figure 2:
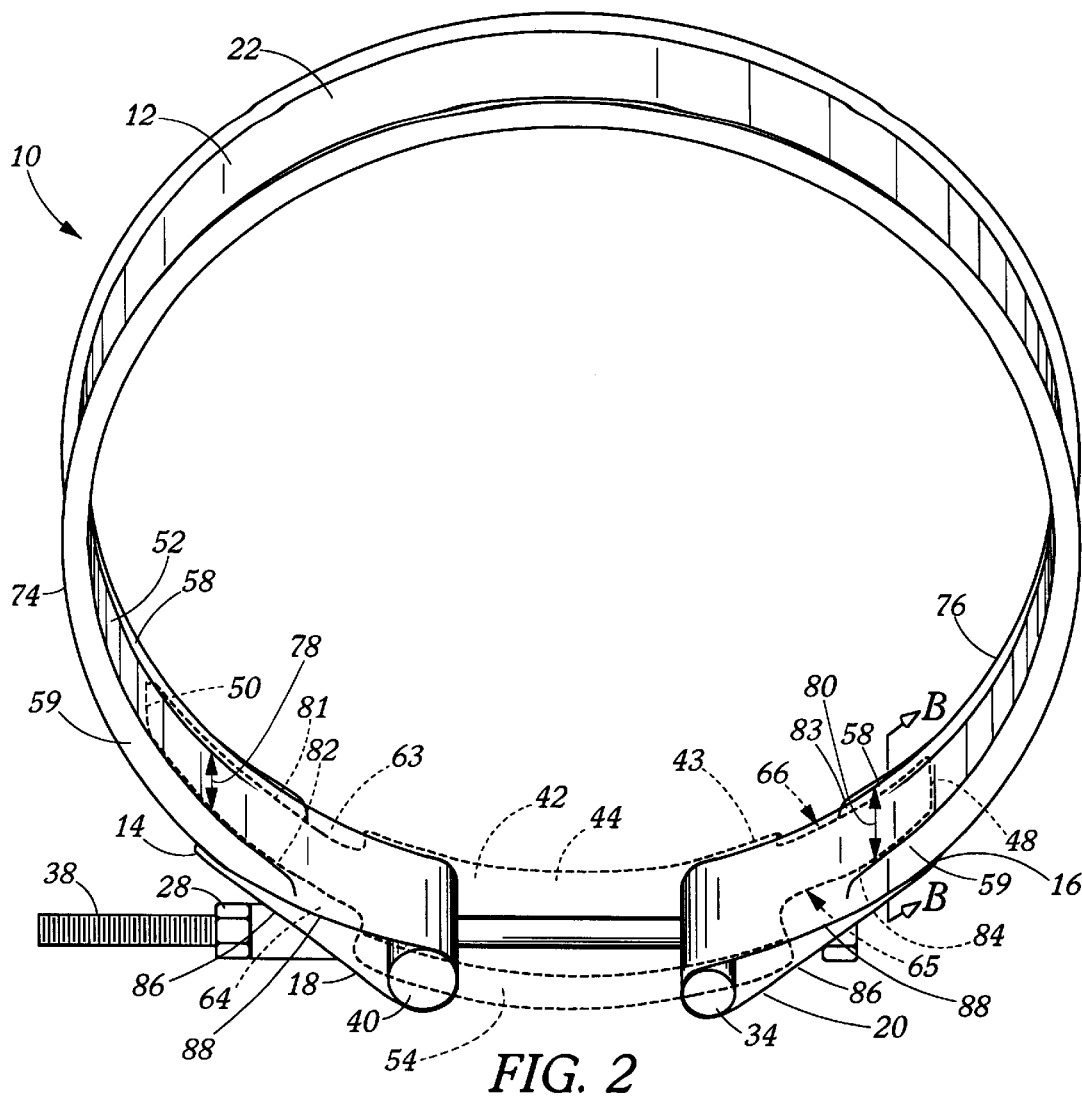
FIG. 2 is a perspective view of the T-bolt hose clamp of FIG. 1 in accordance with an embodiment of the present invention.

Referring to FIGS. 1 and 2, a hose clamp in accordance with an embodiment of the present invention is shown generally at 10, comprising a hose clamp band member 12 in accordance with an embodiment of the present invention. In use the band 12 is disposed in circumscribing relation to a hose (not shown but conventional), which in turn is disposed about a nipple or comparable fitting (not shown but conventional). The hose clamp band 12 includes a first end 14 and a second end 16, and may be formed of any suitable and/or conventional generally resilient material, including stainless steel. The ends 14, 16 in accordance with this particular illustrated embodiment include radially outward extending portions that are turned back upon themselves as is known in the art to form opposing loops 18, 20 respectively, each having an outer loop portion 86 and an inner loop portion 88. At least one of the outer loop portions 86 is attached at at least one point defining a connection point 90 to the underlying inner loop portion 88, which in the embodiment shown in FIG. 2 comprises a portion of the band member outer surface 22. Connection of the outer loop portion 86 to the inner loop portion 88 at the connection point 90 in accordance with this and other embodiments of the present invention may be by any conventional and/or suitable means such as by welding at one or more points between the respective connection surfaces, but can be attached to one another by any suitable and/or conventional means, e.g, chemical bonding as through use of an adhesive, or mechanical affixation as by clipping.

The loops 18, 20 in accordance with an embodiment of the present invention are each provided with an aperture (not shown) of any suitable and/or conventional dimension and configuration for accepting opposite ends of a "T" bolt member 32 or other suitable tightening means. One example of the engagement of a T-bolt member in opposing looped ends of a T-bolt clamp band is shown in aforementioned U.S. Pat. No. 2,857,832, the contents of which with regard to same is hereby incorporated by reference. The "T" bolt member 32 includes a transverse portion 34 and a shank portion 36 having a shank extremity 38. The transverse portion 34 journals within the loop 20 through an aperture therein (not shown but conventional), and the shank portion 36 extends through this same aperture, across the space between the band's loops 18, 20, through an aperture in the opposing loop 18, and is slidably received in a generally annular trunnion 40 of any conventional or suitable construction. The shank extremity 38 extending through the trunnion 40 is provided with threads or other suitable engagement means. A nut 28 or other complementary engagement means is threaded or otherwise applied to the shank extremity 38. In applying the clamp 10 about an underlying hose, tightening of the nut 28 causes the respective band loops 18, 20 to draw one to the other, thereby constricting the inner diameter of the band about the underlying hose as is well known.

The clamp 10 in the illustrated embodiment further comprises a bridge 42 extending generally between the opposing loops 18, 20 in a position radially inward of the bolt member 32, and comprising a radially inward facing surface 44 and a radially outward facing surface 46, a first bridge end 48 and a second bridge end 50. The bridge 42 may similarly be formed of any suitable and/or conventional generally resilient material, including stainless steel. As assembled, a portion of the bridge's radially outward facing surface 46 is in opposing relation to at least a portion of the inward facing surface 52 of the outer band 12 as shown.

The bridge 42 may optionally be attached at one end 48 to the band, such as by welding the outer surface 46 of the bridge 42 to the inner surface 52 of the band 12, e.g., proximal end 16 at weld points 43. Where the bridge 42 is so attached, as shown in FIG. 1, tightening of the T-bolt member 32 (by means of, e.g., threading a nut engaged thereto) draws the ends 14, 16 of the band 12 toward one another, with the first end 14 sliding along the radially outward facing surface 46 of the bridge 42. In an alternative arrangement, the bridge may be unattached to the band (hereinafter referred to as a "floating" bridge), such that with tightening of the T-bolt in applying the clamp to an underlying hose, the floating bridge is positioned to slidingly engage both band ends, not necessarily but beneficially to substantially the same extent, and a portion of the bridge extends beneath a portion of the band at either band end.

In the embodiment shown in FIG. 2, the bridge 42 is moreover provided with radially outward projecting flanges 54 (only one of which is shown but the opposite being substantially the same) along portions of the lateral edges thereof. While not necessary in the practice of the present invention, these flanges 54 generally provide improved radial pressure in the region between the band ends 14, 16 by restricting the bridge's tendency to buckle under the force generated by the tightening of the T-bolt member 32 in applying the clamp 10 to the underlying hose.

In accordance with an embodiment of the present invention illustrated in FIGS. 1 and 2, the band 12 possesses two radially inward projecting ribs 58, 59, each such rib 58, 59 extending longitudinally along only a portion of the band 12 at a respective lateral edge 74, 76 thereof. As illustrated in FIG. 2, the ribs 58, 59 may optionally be formed to have a certain height P such that in the clamp's engaged position about an underlying hose, at least the innermost portion 62 of the rib 58 is in substantially the same cross-sectional plane Q as the inner surface 44 of the bridge 42.

The ribs 58, 59 provide the beneficial function of reducing distortion of the band as it is rolled from a flat to a generally cylindrical configuration, and also reduces the incidence and/or severity of damage to the underlying hose that generally otherwise may be imparted thereto by the generally sharp band lateral edges 74, 76 as the band is constricted about a hose.

In addition, the form of the ribs 58, 59 in accordance with an embodiment of the present invention provides further benefits. As shown in cross-section in FIG. 3, the ribs 58, 59 in accordance with an embodiment of the present invention comprise a generally radially inward projecting component 97, a radially innermost portion or peak 62, as well as a generally radially outward projecting component 98, the latter of which optionally but beneficially is in one of substantially the same cross-sectional plane as the outer surface of the band and a point radially inward of said plane. That is, the outward projecting component does not extend beyond the cross-sectional plane W of the outer surface 22 of the band 12. Thus, as applied about a hose, the inner diameter of the band 12 at each innermost portion 62 thereof is smaller than that defined by the balance of the band's inner surface 52, which creates in effect redundant high-pressure sealing rings about the circumference of the underlying hose. The configuration would moreover likely reduce the incidence and/or severity of hose rubber axial extrusion from beneath the band with tightening of the hose clamp by trapping such hose material between the ribs 58, 59.

Figure 4:
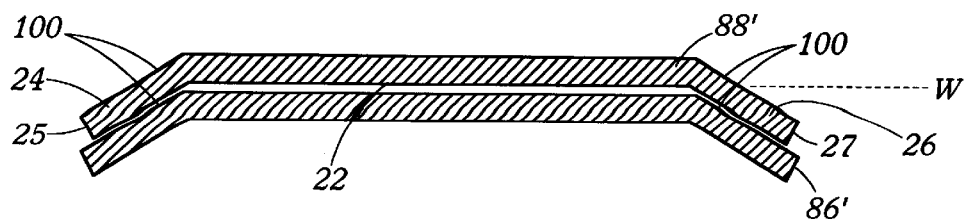
FIG. 4 is a cross-sectional view of a T-bolt hose clamp employing an alternative flare configuration.

In contrast, an alternative flare cross-sectional configuration is illustrated in FIG. 4. The flares 24, 26 each comprise a generally radially outward extending portion 100, which can be seen to extend beyond, i.e., radially outward from, the band's outer surface 22. Thus, while potentially providing distortion resistance properties and reduced possibility of hose damage as described above, the flare configuration shown in FIG. 4 would not provide the dual regions of high pressure sealing, or the rubber extrusion resistance noted above. Moreover, the overlap of opposing portions of the band, i.e., the loops' inner portion 88' and outer portion 86', each incorporating outward projecting flares 24, 26 as described above and illustrated in FIG. 4 in order to weld the opposing surfaces together to form respective loops would generally result in a nesting problem. That is, the flares 24, 26 at the lateral edges 25, 27 of the outer portion 86' would generally interfere with intimate surface contact of the relevant opposing band loop inner portion 88' as shown, thus resulting in undesirable voids therebetween and potentially unacceptable surface contact between the relevant surfaces to be welded to one another. This could be resolved by trimming away, i.e., narrowing, that portion of the band end disposed above a lower portion thereof in its looped configuration by trimming the flared portions therefrom, so that the so-narrowed outer portion nests within the radially outward projecting flares along the lateral edges 25, 27 of the inner portion portion. This configuration has the drawback however of weakening the band end at the narrowed portion and results in a reduced weld-to-edge distance. This condition complicates the welding process and causes undesirable weld "spitting".

Conversely, in accordance with an embodiment of the present invention, the ribs 58, 59 extend along a portion of the length of the band 12, optionally including a portion of the inner loop portion 88; but the ribs 58, 59 do not extend to that part of the outer loop portion 86 comprising the connection point 90. In the embodiment shown in FIG. 2, the ribs 58, 59 extend along a portion of the length of the band 12 optionally including at least a part of the inner loop portion 88, but do not extend along the entire length of the outer loop portion 86, and particularly that portion thereof including it's connection point 90 to the inner loop portion 88. In accordance with an embodiment of the present invention, at least a portion of the outer loop portion 86 is characterized by a substantially flat cross-sectional configuration across the loop's width R in at least that portion of the loop 18, 20 including the connection point 90.

Figure 3:
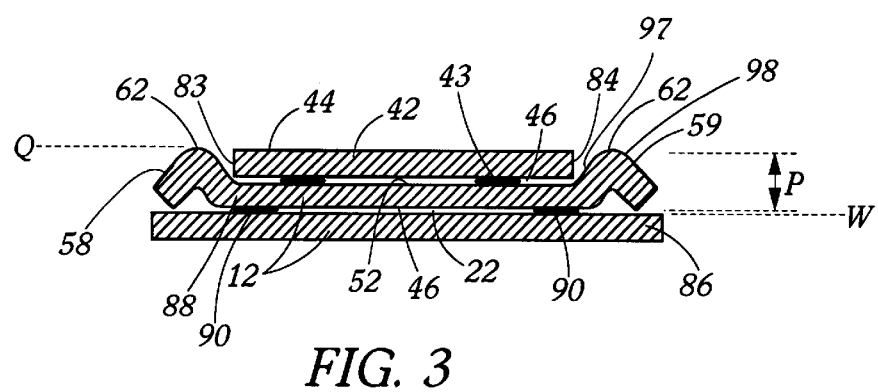
FIG. 3 is a cross-sectional view of the T-bolt hose clamp of FIG. 2 along B—B thereof.

As illustrated in FIG. 3, by providing at least an outer loop portion 86 having a substantially flat cross-sectional configuration across at least the region including its connection point 90 to the underlying inner loop portion 88, and moreover forming the ribs 58, 59 such that their radially outward projecting component 98 does not extend to any significant degree beyond the cross-sectional plane W of the band's outer surface 22, the present invention in accordance with this embodiment thereof allows that the relevant surfaces of the outer portion 88 and inner portion 86 to be bonded or otherwise connected to one another to form the loops 18, 20 do not have portions interfering with one another thereby creating voids and potentially incomplete or insufficient welds, and can conversely be readily disposed fully against one another, ensuring a durable and complete connection as by spot-welding.

The practitioner of ordinary skill in the relevant art would readily appreciate the appropriate dimensions for hose clamp members including band members for use in a given environment and/or application in accordance with the description provided herein for various embodiments of the present invention. While the curved inner- and angled outer cross-sectional shape of the ribs 58, 59 shown in the illustrated embodiments have been found to be advantageous within the practice of embodiments of the present invention and are moreover straightforward and economical to achieve in flat steel bands through, e.g., applying a suitably shaped male punch to the band's surface 52 while the band is supported in an open channel in accordance with conventional embossment processes, alternative cross-sectional configurations may equally well be employed in the practice of further embodiments of the present invention to provide the rib with other cross-sectional configurations such as squared.

As illustrated in the embodiment of the present invention shown in FIG. 2, the bridge 42 is optionally provided with a reduced width portion 78, 80 at one or both ends 48, 50 of the bridge, and preferably at least the bridge end 50 at which sliding engagement with the band 12 occurs with tightening of the clamp. In accordance with this illustrated embodiment of the present invention, the lateral ends of the bridge 42 at the reduced width portions 78, 80 define the laterally inner boundaries 81, 82, 83, 84 of the bridge's apertures 63, 64, 65, 66.

The ribs 58, 59 and apertures 63, 64, 65, 66 may be formed to have any convenient or suitable dimensions. In a non-limiting example employing a band 12 possessing a conventional width of about 0.750 inches and a thickness (or gauge) of about 0.025 inches and a bridge member 42 similarly having a gauge of about 0.025 inches, the ribs 58, 59 may be formed in accordance with conventional embossment processes as described hereinabove to have a height P of about 0.050 inches; and the apertures 63, 64, 65, 66 may be formed, e.g., by forming the reduced width portion 78, 80 of the bridge to have a width of approximately 0.600 inches, thus yielding an aperture of about 0.075 inches at each lateral edge of the bridge to accommodate the associated rib 58, 59.

The ribs 58, 59 in accordance with this particular embodiment are optionally provided with the appropriate dimensions so that they extend at least from the point at which the inward facing surface 52 of the band 12 terminates in a position adjacent the inward facing surface 52 of the band 12; and at least their most radially inward projecting portion 62 is in substantially the same cross-sectional plane Q as the inner surface 44 of the bridge 42 when the clamp 10 is in its engaged position circumscribing the underlying hose. In the particular embodiment illustrated in FIG. 2 however the ribs 58, 59 extend along at least a portion of the length of the bridge's apertures 63, 64, 65 66. This provides the further benefit of essentially eliminating the interruption in sealing pressure otherwise created by the step otherwise formed against the inner surface of the band at each bridge end; in accordance with this particular embodiment of the present invention, a substantially constant radius is maintained about the inner circumference of the clamp 12. This feature is described more fully in my co-pending U.S. patent application filed on the same date hereof, the contents of which are hereby specifically incorporated herein.

Figure 5:
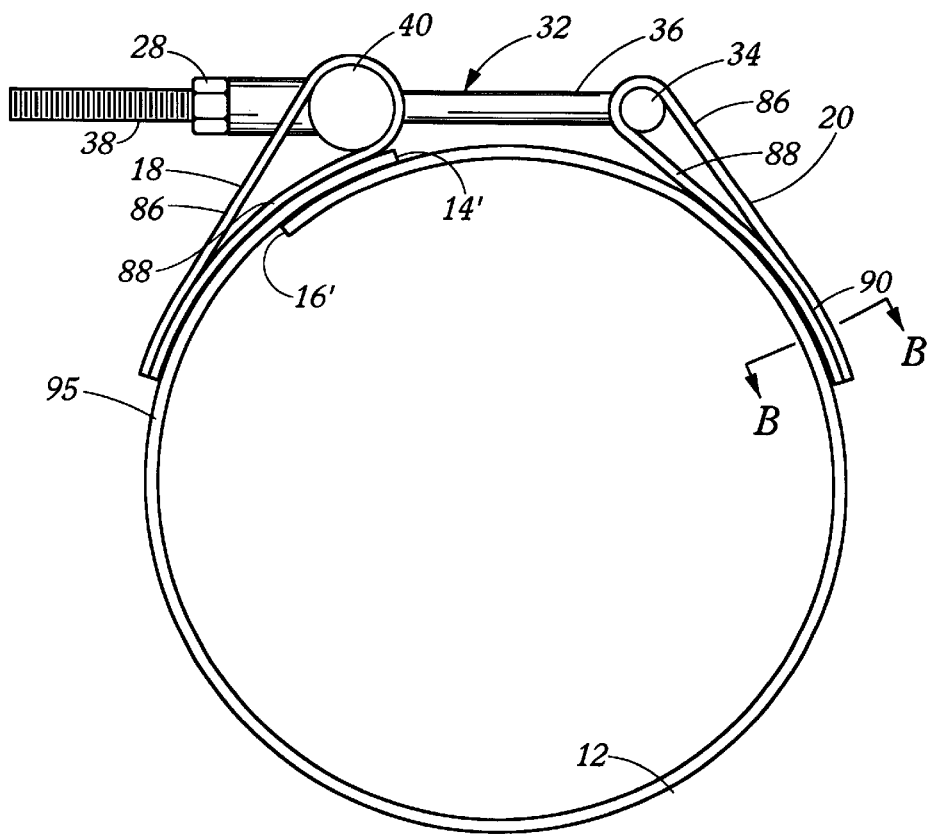
FIG. 5 is a side view of a T-bolt hose clamp incorporating a band member in accordance with further embodiments of the present invention.
Figure 6:
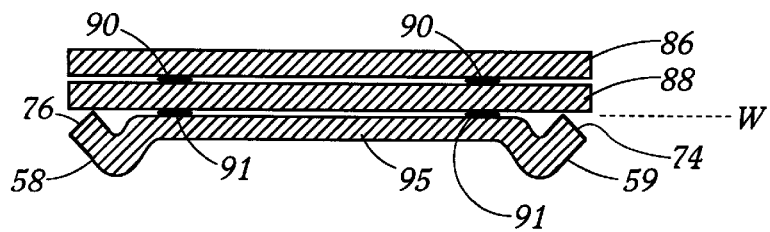
FIG. 6 is a cross-sectional view of the T-bolt hose clamp of FIG. 5 along B—B thereof.

Turning now to a further embodiment of the present invention illustrated in FIGS. 5 and 6, a T-bolt clamp 10 is shown comprising a band 12, which is provided with two longitudinally extending ribs 58, 59, each being located at and extending along an opposing band lateral edge 74, 76. In this illustrated embodiment, the band 12 comprises loops 18, 20 formed of substantially flat generally resilient pieces separate from a resilient elongate piece forming the central hose-circumscribing portion 95 of the band 12. The hose-circumscribing portion 95 in accordance with this illustrated embodiment of the present invention includes longitudinal ends 14', 16' that may overlap one another as shown, optionally but not necessarily in the region generally beneath one or another of or between the loops 18, 20.

According to this particular embodiment of the present invention, ribs 58, 59 as described above with reference to the embodiments illustrated in FIGS. 1–3 are again formed in the band 12, but specifically in the hose-circumscribing portion 95 thereof extending from the opposing band ends 14', 16'. This allows for the loops 18, 20 to be formed in a substantially flat cross-sectional configuration across their entire length. The loops 18, 20 may be attached, again as by welding, bonding, or any other suitable or conventional means, to the outer surface 22' of the hose-circumscribing portion 95 at one or more points 90.

The loops 18, 20 in accordance with this embodiment of the present invention are again each provided with an aperture (not shown) of any suitable and/or conventional dimension and configuration for accepting opposite ends of a "T" bolt member 32 or other suitable tightening means. The "T" bolt member 32 includes a transverse portion 34 and a shank portion 36 having a shank extremity 38. The transverse portion 34 journals within the loop 20 through an aperture therein (not shown but conventional), and the shank portion 36 extends through this same aperture, across the space between the band's loops 18, 20, through an aperture in the opposing loop 18, and is slidably received in a generally annular trunnion 40 of any conventional or suitable construction. The shank extremity 38 extending through the trunnion 40 is provided with threads or other suitable engagement means. A nut 28 or other complementary engagement means is threaded or otherwise applied to the shank extremity 38. In applying the clamp about an underlying hose, tightening of the nut 28 causes the respective band loops 18, 20 to draw one to the other, thereby constricting the inner diameter of the band about the underlying hose as is well known.

The embodiment of the present invention illustrated in FIGS. 5 and 6 provides for the elimination of a bridge member as described above with reference to the embodiments shown in FIG. 2, and may moreover provide additional potential cost savings through the simplification of process steps required to produce the bands 12.

Although the present invention has been described in detail for the purpose of illustration, it is to be understood that such detail is solely for that purpose and that variations can be made therein by one skilled in the relevant art without departing from the spirit or scope of the present invention except as it may be limited by the appended claims. The invention disclosed herein may suitably be practiced in the absence of any element not specifically disclosed herein.

What is claimed is:

1. A hose clamp band member for a hose clamp, for encircling at least a portion of the outer circumference of a hose and imparting a radially inward directed compressive force to seal said hose to a fitting; and comprising a radially outward facing surface, a radially inward facing surface, a width extending from a first lateral edge to an opposite second lateral edge, a length extending from a first band end to an opposite second end, at least one of a first loop member at said first band end, and a second loop member at said second end, at least one said loop member comprising an outer loop portion and an inner loop portion, said outer loop portion and said inner loop portion each having a surface being disposed against and connected to a surface on the other thereof to define a connection point; and characterized in that said band further comprises a radially inward projecting rib extending along a portion of at least one said lateral edge of said band for providing a high pressure sealing region in said clamp, and said outer loop portion in a region including said connection point possesses a substantially flat cross-sectional configuration.

2. The hose clamp band of claim 1 comprising two said ribs, one each of said ribs extending along a respective said lateral edge of said band.

3. The hose clamp band of claim 1 wherein said rib comprises a radially inward projecting component and a radially generally outward projecting component, the band being formed and arranged such that in the band's engaged position about the hose, at least the radially outermost portion of said outward projecting component is in one of substantially the same cross-sectional plane as the outer surface of the band and a point radially inward of said plane.

4. A hose clamp for clamping a hose about a fitting, comprising:
   a) the hose clamp band of claim 1; and
   b) a bolt member for extending between said band ends through an aperture in said at least one loop member, and comprising a transverse portion and a shank portion, and for urging said band ends toward one another.

5. The hose clamp of claim 4 further comprising a bridge member for extending from said first band end to said second band end in a position radially inward of said bolt member, and comprising a radially inward facing surface and a radially outward facing surface, a first bridge end and an opposite second bridge end, a portion of said radially outward facing surface being adapted for being disposed against at least a portion of said inward facing surface of said band.

6. The hose clamp of claim 5 wherein said bridge comprises at least one aperture having a length extending inward from at least one of said first bridge end and said second bridge end, for slidably receiving and engaging said rib with tightening of said clamp such that at least a portion of said rib extends within at least a portion of said length of said aperture.

7. The hose clamp of claim 5 wherein said inward projecting rib is formed so that in the clamp's engaged position about the hose, at least the radially innermost portion of said rib is in substantially the same cross-sectional plane as the inner surface of the bridge.

8. The hose clamp of claim 6 wherein said bridge comprises a reduced width portion having a length extending inward along a portion of the bridge from at least one of said first bridge end and said second bridge end whereby at least one said bridge lateral edge at said reduced width portion forms a boundary of said aperture.

9. A hose clamp for clamping a hose about a fitting and sealing the connection therebetween, comprising:
   a) a hose clamp band member for encircling at least a portion of the outer circumference of said hose, comprising a radially outward facing surface, a radially inward facing surface, a width extending from a first lateral edge to an opposite second lateral edge, a length extending from a first band end to an opposite second end, a first loop member at said first band end, and a second loop member at said second end, each said loop member comprising an outer loop portion and an opposing inner loop portion, each said outer loop portion and said inner loop portion having a surface being disposed against and connected to a surface on the opposing thereof to define a connection point; and
   b) a bolt member for extending between said band ends through an aperture in at least one said loop member, and comprising a transverse portion and a shank portion, and for urging said band ends toward one another; and
   c) characterized in that said band further comprises a radially inward projecting rib extending along at least a portion of each of said lateral edges of said band for providing a high pressure sealing region in said clamp, and each said outer loop portion in a region including said connection point to each said opposing inner loop portion possesses a substantially flat cross-sectional configuration.

\* \* \* \* \*